US006527864B2

(12) United States Patent
Quetti

(10) Patent No.: US 6,527,864 B2
(45) Date of Patent: Mar. 4, 2003

(54) DEVICE FOR THE AUTOMATIC REGULATION OF THE QUANTITY OF ADHESIVE DEPOSITED IN FLEXIBLE FILM ROLLING MACHINES

(75) Inventor: Gianpiero Quetti, Legnano (IT)

(73) Assignee: Novachem Industriale S.r.l., Legnano (IT)

( * ) Notice: Subject to any disclaimer, the term of this patent is extended or adjusted under 35 U.S.C. 154(b) by 19 days.

(21) Appl. No.: 09/817,406

(22) Filed: Mar. 26, 2001

(65) Prior Publication Data

US 2001/0027747 A1 Oct. 11, 2001

(30) Foreign Application Priority Data

Mar. 28, 2000 (IT) ........................................ MI00A0648

(51) Int. Cl.[7] ................................................ A01J 27/02

(52) U.S. Cl. ....................... 118/683; 118/694; 118/712; 118/249; 118/262

(58) Field of Search ................................ 118/674, 683, 118/694, 712, 249, 262; 427/8, 207.1, 428; 156/350, 356, 360

(56) References Cited

U.S. PATENT DOCUMENTS 3,215,558 A * 11/1965 Dascher ...................... 118/674
4,449,476 A * 5/1984 Voswinckel et al. ........ 118/694
5,447,566 A * 9/1995 Loiacono .................... 118/674
5,876,784 A * 3/1999 Hesselmann ................... 427/8
6,258,168 B1 * 7/2001 Pawelko et al. ............ 118/688

* cited by examiner

*Primary Examiner*—Laura Edwards
(74) *Attorney, Agent, or Firm*—Hedman & Costigan, P.C.

(57) ABSTRACT

A device for the automatic regulation of the quantity of adhesive deposited in flexible film rolling machines (20). These machines (20) include a coating column (21) and a bonding column (22), joined to each other by an upper frame (23); the premixed adhesive is loaded in a container (32), which is provided in a space formed between two adjacent cylinders (13, 14) and carried by the motion of two intermediate cylinders (13, 12) to a cylinder (15) designed to drag along the film (31). In this device, the adhesive is fed in a continuous manner from an automatic mixer (40), so as to vary the quantity dispensed per unit time depending on the basic pre-established weight and on the instantaneous speed of the rolling machine, the speed of the intermediate cylinders (12, 13) is varied automatically to increase or decrease the volume of adhesive laid down on the film (31).

6 Claims, 3 Drawing Sheets

DEVICE FOR THE AUTOMATIC REGULATION OF THE QUANTITY OF ADHESIVE DEPOSITED IN FLEXIBLE FILM ROLLING MACHINES

The present invention relates to a device for the automatic regulation of the quantity of adhesive deposited in flexible film rolling machines.

It is known that the rolling machines used for the production of flexible film composites are composed of a coating and a bonding column, joined to each other by an upper frame.

The coating column consists of a metal structure bearing: a coating group for adhesives without solvents, a heating station, a first film unwinding unit to be subjected to the coating operation, and a control unit.

The bonding column consists in a metallic structure holding the following: a bonding unit and the heating unit, a second unwinding unit that participates in the bonding process, the winding unit and the second control unit.

In the coating units the solvent-free adhesive is fed discontinuously from a (prevalently piston-type) mixer, capable of volumetrically regulating the ratio between the two components of the adhesive system.

The pre-mixed adhesive is loaded in a space formed between two cylinders of the coating goup. Said cylinders form a container for the adhesive.

One of these cylinders is prevalently still, while the other rotates at a certain speed and is in contact with a connecting cylinder rotating at a higher speed.

The connecting cylinder is also in contact with the film dragging cylinder an its pressing cylinder. The latter rotate at the speed of the film, which is greater than that of the connecting film.

The adhesive is therefore drawn from its holding tray, meaning the first two cylinders, while using speeds ever greater than those of the cylinders following them.

By regulating the relative speed of the connecting cylinder by means of a potentiometer, the operator can increase or decrease the basic weight of the adhesive deposited on the rolling film.

The control of the basic weights deposited is done by weighing the rolled film and calculating the difference with the same film after the adhesive has been removed. However, this method is rather approximate, especially when also considering the tiny quantities of adhesive deposited.

While operating the pre-determination of the quantities deposited is left up to the experience and sensitivity of the operator and controlled by the mentioned system. The purpose of this invention is therefore to produce a device for the automatic regulation of the quantity of adhesive in flexible film rolling machines capable of resolving the mentioned problems, while achieving better operating characteristics and a better control of finished product quality.

These and other purposes are achieved by a device or the automatic regulation of the quantity of adhesive in flexible film rolling machines wherein said rolling machine (20) includes a coating column (21) and a bonding claim (22), joined to each other by an upper frame (23), and wherein a quantity of premixed adhesive is charged to a container (32) generally formed by a space formed between two cylinders set side by side (13, 14) and transported by the motion of one of said adjacent cylinders (13) to a film (31) dragging cylinder (15), wherein said adhesive is fed continuously from an automatic mixer (40), capable of varying the quantities fed per unit time depending on pre-established basic weights, and on said rolling machine's (20) instantaneous speed, said adjacent cylinders (12, 13) having a speed which is automatically varied so as to increase or decrease the quantity of adhesive deposited on said film (31).

Additional purposes and advantages of this invention will become clear from the following description and its attached drawings, supplied for purely explanatory and non-limiting purposes, in which.

Figure 1:
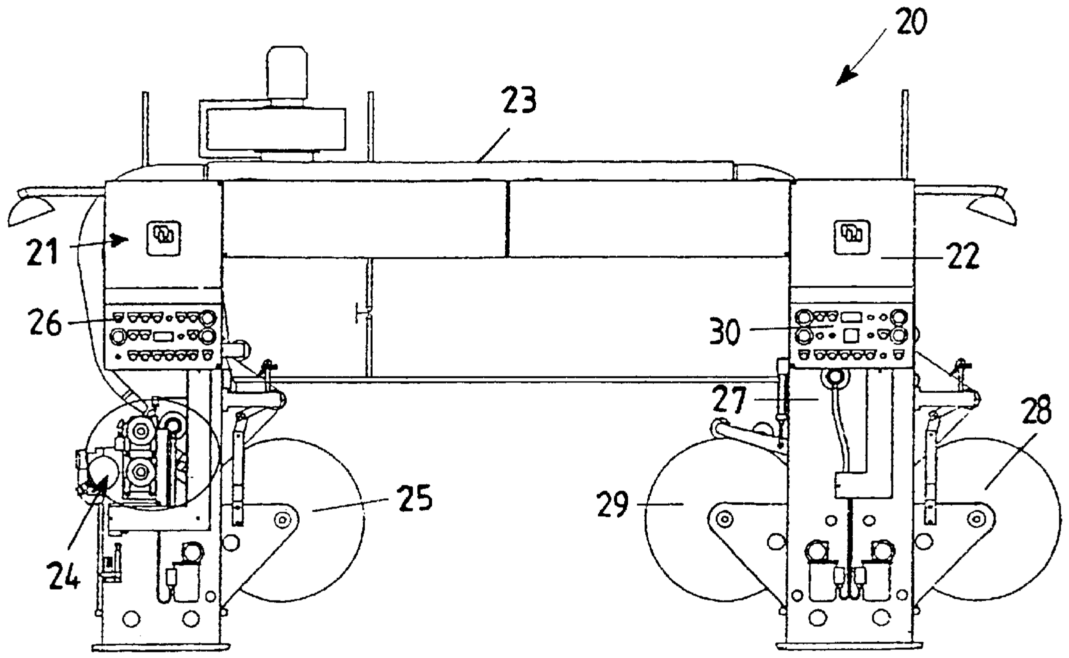
FIG. 1 shows a side view of a machine for flexible film rolling, incorporating a device for automatically regulating the quantity of adhesive deposited, according to this invention.
Figure 2:
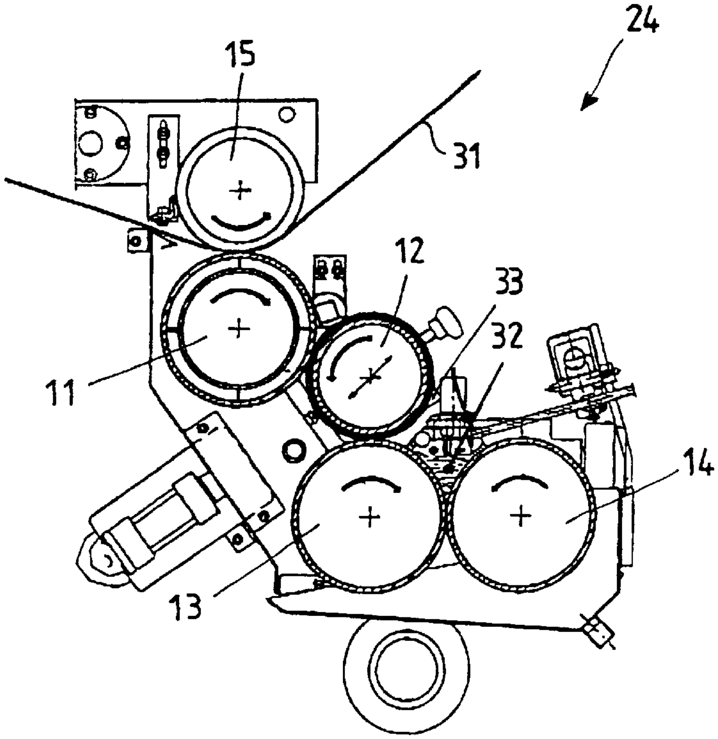
FIG. 2 shows a cross-sectional side view of a coating unit belonging to a flexible film rolling machine, incorporating the device described in this invention.
Figure 3:
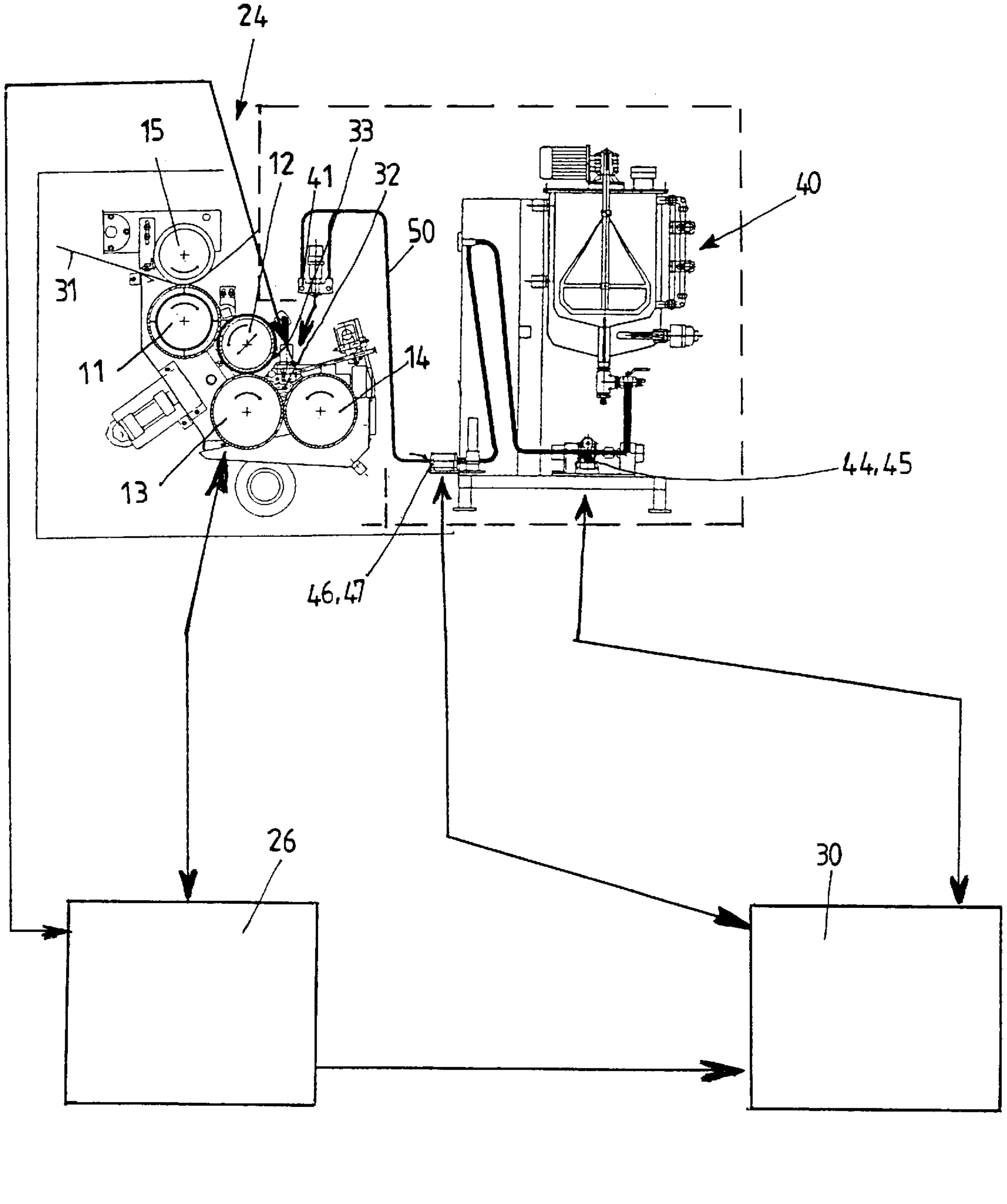
FIG. 3 shows a diagram illustrating the operation of the device according to this invention.
Figure 4:
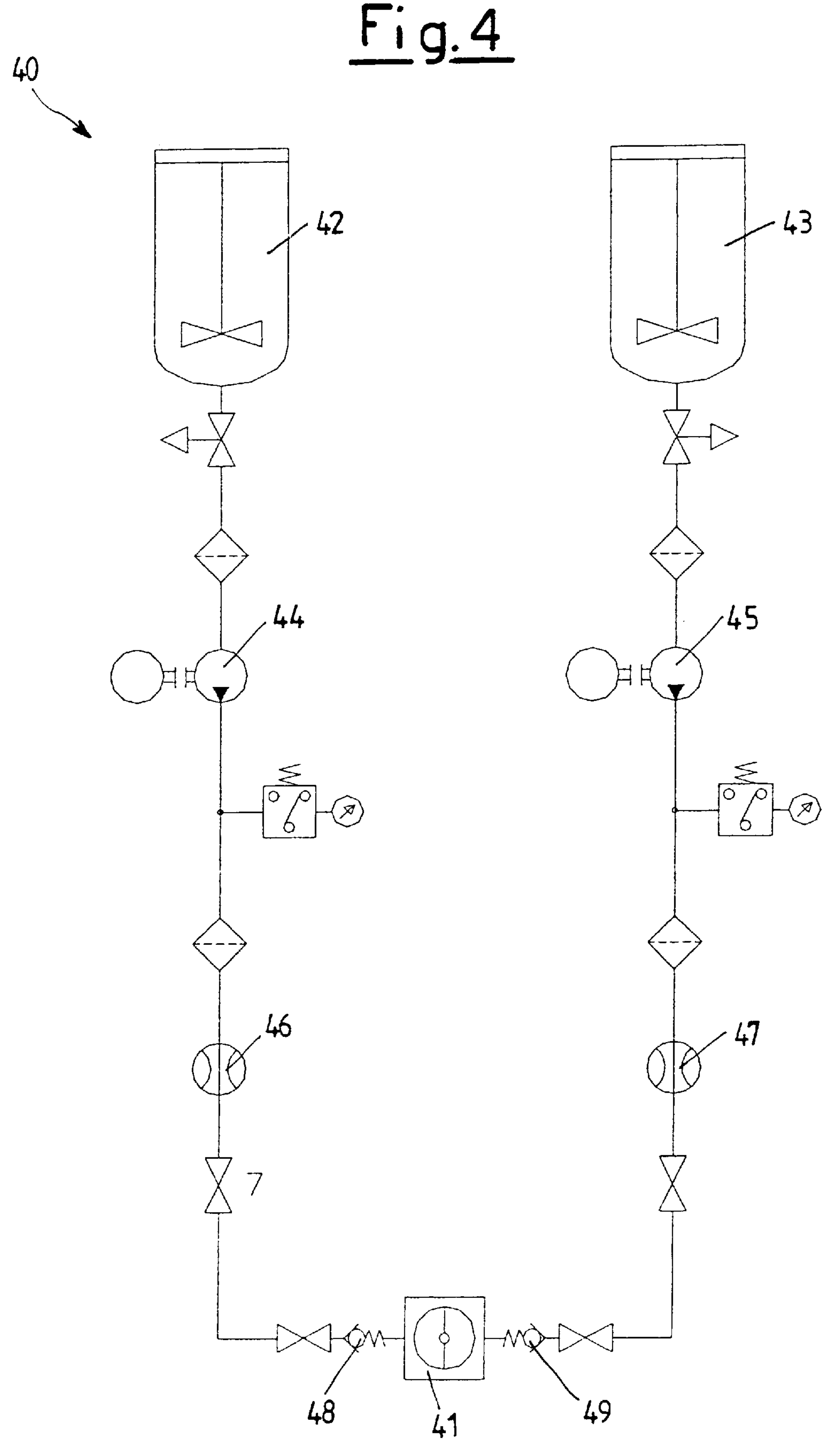
FIG. 4 illustrates a diagram relating to an automatic mixer, belonging to this invention.

With a particular reference to these drawings, the flexible film rolling machine is indicated in its overall form by the reference number 20.

It depicts a coating column 21 and a bonding column 22, joined to each other by an upper frame 23.

The coating column 21 consist in a metallic structure, holding a coating unit 24 for solvent-free adhesives, a heating station, a first film unwinding unit 25 to be subjected to a coating operation, and a first control panel 26.

The bonding column 22 is also a metallic structure, holding a bonding unit 27 and a heating station, a second unwinding unit 28 for the film destined to participate in the bonding operation, a winding unit 29 and a second control panel 30.

Contrary to the present mixing units feeding the adhesive in a discontinuous manner, in the coating unit 24 the adhesive is fed continuously from an automatic mixer 40.

In this manner, the automatic mixer allows feeding the adhesive in a continuous manner, while varying the quantities per unit time, depending on the pre-established basic weights and the instantaneous speed of the rolling machine.

The automatic mixer 40 includes a tank 42 for the first component of the adhesive, and a tank 43 for the second component of the adhesive.

The system also includes some flow rate measuring devices for the adhesive 46, 47 and the sensors 44, 45 for the regulating signal of the speed of the pumps of the mixer 40.

The pre-mixed adhesive is charged to the space between the cylinders 13 and 14 belonging to the coating unit while passing the outlet 41 and the check valves 48, 49.

The space between the two cylinders 13 and 14 forms a kind of container 32 to contain the adhesive.

This guarantees the maintenance of a precise feeding quantity, in this case only between the cylinders 13 and 14, which translates to a quantity per square meter of film.

At this point, care must be taken that the same quantity is fed to the film 31, through a passage on the cylinders 13, 12 and 11 (arranged in a sequence).

It should be noted that the cylinder 11 and it pressurizing cylinder 15 rotate at the speed of the film 31, and that the cylinder 14 is standing still, while the cylinder 13 rotates, it should be noted that the connecting cylinder also rotates at a speed relatively greater than that of the cylinder 13, but lower to that of the cylinder 11.

Staring from a certain relative velocity of the intermediate cylinders 12 and 13 with respect to the speed of the cylinder 11 (and therefore of film 31), two cases may therefore occur:

in a first case, an increase in the level of adhesive in the container 32 (between the cylinders 13 and 14) indicates that a basic weight lesser than the pre-established value is depositing on the film 31, in the other case, a decrease in the level of adhesive in the container 32 indicates that the process runs at basic weights higher than expected.

The invention therefore utilizes a system of level sensors 33, which may detect variations of the same, while communicating them to the control panel 26, which acts on the speed of the cylinders so as to increase or decrease the quantities deposited, up to the balancing point between the quantities reaching the container 32 from the automatic mixer 40, and those transferred from the container 32 to the surface of the film 31 to be rolled.

Incidentally, it is worth noting that this fact highlights the particular and advantageous operating precision guaranteed by this invention.

In effect, the control panel 26 informs the control panel 30 of the mixer about the instantaneous speed of the rolling machine, and a corresponding speed regulating signal of the adhesive pumps is fed by the control panel 30, through the sensors 44 and 45, so as to allow them to feed the expected basic weight at any given moment.

A further signal of the adhesive flow rate is transmitted to the mixing control panel 30 by the flow meters 46, 47.

The cooperation of these signals therefore allows an automatic feeding of the quantity of adhesive to be supplied to the container 32, and subsequently to be deposited to the film 31.

The above description clearly outlines the characteristics as well as the advantages of the device for the automatic regulation of the deposited quantity of adhesive as an object of this invention. It is finally clear that numerous variants may be applied to the device for the automatic regulation of the deposited quantity of adhesive, object of this invention, without thereby abandoning the principles of novelty inherent in the inventive concept.

In the practical implementation of the invention, the materials, shapes and dimensions of the illustrated details may be of any kind, depending on the requirements, and the same may be replaced by others of a technically equivalent type.

What is claimed is:

1. A device for the automatic regulation of quantities of adhesive deposited in a flexible film rolling machine (20), wherein said rolling machine (20) includes a coating column (21) and a bonding claim (22), joined to each other by an upper frame (23), and wherein a quantity of premixed adhesive is charged to a container (32) generally formed by a space formed between two cylinders set side by side (13, 14) and transported by the motion of one of said adjacent cylinders (13) to a film (31) dragging cylinder (15), wherein said adhesive is fed continuously from an automatic mixer (40), capable of varying the quantities fed per unit time depending on pre-established basic weights, and on said rolling machine's (20) instantaneous speed, said adjacent cylinders (12, 13) having a speed which is automatically varied so as to increase or decrease the quantity of adhesive deposited on said film (31).

2. A device according to claim 1, wherein said flexible film rolling machine (20) includes at least one intermediate cylinder (12), where the speed of said intermediate cylinder is automatically varied so as to increase or decrease the quantities of adhesive deposited on the film (31).

3. A device according to claim 1, wherein a level sensing system (33) is provided for detecting variations of the adhesive in said container (32).

4. A device according to claim 2, wherein level sensors (33) communicate an adhesive level value, which is present inside said container (32), to a control panel (26), which is capable of regulating the speed of said intermediate cylinders (12, 13).

5. A device according to claim 3, wherein a signal relating to the speed of at least one of said cylinders is fed by a control panel (30) of said mixer (40), so as to coordinate the regulation of the speed of the adhesive pumps, by using sensors (44, 45).

6. A device according to claims 3 or 4, wherein flowmeters (48, 49) are provided for generating further adhesive flow signal, which is fed to control panel (30) of the mixer (40).

* * * * *